Aug. 12, 1941.   F. G. LOGAN   2,252,296
REGULATING APPARATUS FOR DYNAMOELECTRIC MACHINES
Filed March 12, 1938
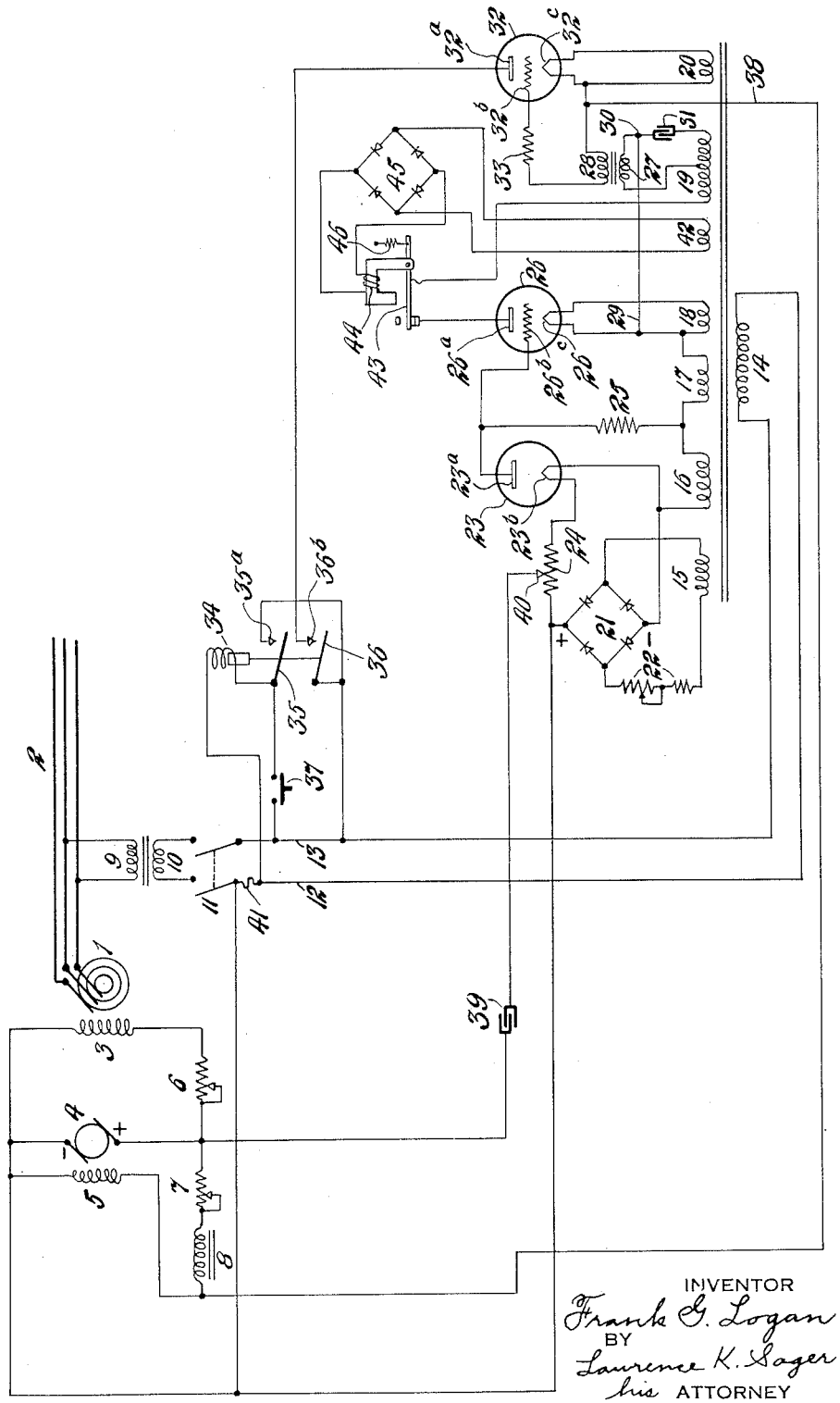
INVENTOR
Frank G. Logan
BY Laurence K. Sager
his ATTORNEY Patented Aug. 12, 1941

2,252,296

UNITED STATES PATENT OFFICE 2,252,296

REGULATING APPARATUS FOR DYNAMO-ELECTRIC MACHINES

Frank G. Logan, North Pelham, N. Y., assignor to Ward Leonard Electric Company, a corporation of New York Application March 12, 1938, Serial No. 195,467

10 Claims. (Cl. 171—119)

This invention relates to the regulation of dynamo-electric machines having a field winding, the control being accomplished by regulation of the field excitation of the machine. The invention is particularly well adapted to control the output voltage of alternating current generators, although it may be used for the control of other types of machines by adaptation to the particular character of the machine. The invention also includes improvements in the method of control.

This application is an improvement upon the invention disclosed and claimed in my pending application Ser. No. 77,931, filed May 5, 1936.

One of the objects of this invention is to simplify and reduce the cost of the apparatus described in said application while maintaining the general advantages thereof and to adapt the same for instances of use where the refinement of control need not be within such close limits and the corrective control upon departure from normal conditions need not be so quickly responsive. General objects of the invention are to provide a control which will maintain the machine within close limits of the desired normal condition, to quickly impose a corrective factor of high value in response to a comparatively slight departure from normal and to avoid hunting of the control apparatus. Other objects are to secure regulation without the use of any moving parts and to provide apparatus which requires no special inspection or care for maintenance. The thermionic tubes used may be as readily replaced, when their effective life has elapsed, as an ordinary lamp bulb in a lighting circuit. Another object is to permit manual adjustment to cause the regulating apparatus to maintain a different constant condition without interrupting the action of the apparatus. Another object is to provide automatic protection for the control apparatus and the machine controlled and to automatically act upon occurrence of an abnormal condition, in a manner that will protect the machine controlled and avoid unduly burdening the control apparatus and permit manual adjustment and control until the system is in condition to function again. These and other objects and advantages of the invention will be understood from the following description and accompanying drawing.

The accompanying figure is a diagram showing a preferred embodiment of the invention.

The particular application shown is for maintaining substantially constant the output voltage of an alternating current generator, regardless of change of load or other conditions which would affect the voltage. The dynamo-electric machine 1 is indicated as a three-phase alternating current generator delivering current to the supply mains 2. The field winding 3 of the generator is supplied with current from the armature 4 of an exciter having a field winding 5. An adjustable field rheostat 6 is shown in series with the field winding of the generator for proper adjustment of the field current, and for adjustment when machines are operated in parallel. An adjustable field rheostat 7 is shown in series with the field winding 5 of the exciter for initial adjustment of the current in its field winding or for manual control when the automatic regulation is not being availed of.

The field winding of the exciter is connected in shunt to its armature through the field rheostat 7 in a permanently closed circuit; and also in series in this shunt field circuit is an inductive reactor 8, the purpose of which will be hereinafter explained.

Across a pair of the supply mains 2 is connected a primary winding 9 of a transformer having a secondary winding 10. A switch 11 is adapted to connect this secondary to the leads 12 and 13 which supply current to the control apparatus. Between the leads 12 and 13 is connected a primary winding 14 of a transformer shown as having a number of secondary windings 15, 16, 17, 18, 19 and 20.

The secondary 15 supplies current to a rectifier 21 which may be of any suitable type and is shown as of the copper oxide type of bridge form having positive and negative terminals between the terminals to which the secondary winding 15 is connected. An adjustable resistance 22 is connected in series with the winding 15 for the purpose of adjusting the output of the rectifier 21.

A space discharge tube 23 is shown having an anode 23a and a cathode 23b. The cathode is supplied with heating current by the rectifier 21, the terminals of the cathode being connected to the positive and negative terminals of the rectifier through a resistance 24, the purpose of which will be hereinafter explained. The plate circuit of the tube 23 may be traced from the plate to the cathode and through the secondary winding 16 and thence through a high resistance 25 back to the plate. The function of the resistance 25 will hereinafter be explained.

A three element space discharge tube 26 is shown having a plate 26a, a grid 26b and a cathode 26c. The grid is electrically connected to a point between the plate 23a and a terminal of the resistance 25. Heating current is supplied to the cathode 26c by the secondary winding 18. The grid circuit of the tube 26 may be traced from the left-hand terminal of the secondary winding 17 through the resistance 25 to the grid 26b, cathode 26c and then to the right-hand terminal of the secondary winding 17.

The secondary winding 19 supplies current to a primary winding 27 of an insulating transformer having a secondary winding 28. The left-hand terminal of the secondary 19 is connected through an overvoltage relay switch 43 to the plate 26a of the tube 26, giving a plate circuit from the secondary 19 through the plate 26a, cathode 26c and thence by a connection 29 to a point 30 and then through the primary winding 27 to a mid-tap of the secondary 19. From the right-hand terminal of the secondary 19 a connection is made to a condenser 31, thence to the point 30 and then through the secondary winding 27 to the mid-tap of the secondary 19. It will thus be seen that from the outside terminals of the secondary 19 two circuits extend to the point 30, one of which includes a capacity of a fixed amount and the other of which includes a resistance of a variable amount, as will later be explained, which includes the plate circuit of the tube 26.

The overvoltage relay winding 44 controlling switch 43 is responsive to overvoltage of the supply line 2 and may be supplied by a transformer connected thereto and is shown as supplied by a secondary winding 42 of the transformer having the primary 14, through a rectifier 45, shown as of the copper oxide type of bridge form. The relay switch 43 is biased to closed position by a spring 46.

The half-wave rectifier 32 is shown having an anode 32a, a grid 32b and a cathode 32c. This rectifier tube is of the arc-conduction type, such as a mercury vapor tube, although any suitable arc-conduction type of rectifier may be used. The cathode 32c is supplied with heating current from the secondary winding 20. The grid 32b is connected through a resistance 33 to one terminal of the secondary winding 28, the other terminal thereof being connected to the cathode 32c which completes the grid circuit.

In order to provide means for initiating the operation of the automatic regulator and for protecting the same from abnormal low voltage of the supply line from any cause, a relay is provided having a control winding 34. This controls two movable contacts 35 and 36 adapted to engage respectively the fixed contacts 35a and 36b when the winding 34 is properly energized. One terminal of the winding 34 is connected to the lead 12 and the other terminal is connected to the movable contact 35 and is also adapted to be connected directly to the lead 13 when a normally open pushbutton 37 is closed. The fixed contact 35a and the movable contact 36 are both connected to the lead 13.

The fixed contact 36b is connected to the plate 32a of the rectifier. The cathode 32c of the rectifier is connected by a lead 38 to the field winding 5 of the exciter at a point between this field winding and the inductive reactor 8. The negative terminal of the exciter and of the field winding 5 is connected to the lead 12 and to the left-hand terminal of the resistance 24. The positive terminal of the exciter is connected through a condenser 39 to an adjustable contact 40 which engages the resistance 24. A fuse 41, or other suitable overload protective device, is located in the lead 12 to control the circuit of the primary winding 14 and the relay having the under-voltage winding 34. The accompanying figure shows the parts in the condition when the automatic regulation is not effective. The field rheostat 6 of the generator should ordinarily be placed in the resistance all out position for economy but is desirable for adjustment when generators are operated in parallel. During non-automatic operation, the field rheostat 7 of the exciter may be adjusted to such value as will cause the exciter to supply current of a desired value to the generator field winding 3. The position of this rheostat when the regulator is in operation will be such as to include more resistance in the field circuit of the exciter and thereby cause the exciter armature to supply less current to its field winding than when the regulator is not operating.

When it is desired to utilize the automatic control for maintaining the voltage of the supply lines 2 substantially constant, the first step is to close the switch 11. This then supplies current to the primary winding 14 of the main transformer and causes its secondaries to supply heating current to the cathodes of the tubes. After the lapse of the time required for the arc-conduction tube 32 to attain operating temperature, the pushbutton 37 is temporarily closed and the rheostat 7 is moved from the position of non-automatic operation to the position for automatic operation.

The closure of the pushbutton 37 causes a current to pass through the relay winding 34 from the lead 12 to the lead 13 and immediately closes the relay, after which the pushbutton 37 may be released. The engagement of the movable contact 35 with the fixed contact 35a causes the relay to be maintained closed after the release of the pushbutton by a circuit from the lead 12 through the winding 34, contact 35, contact 35a and thence to the lead 13. The engagement of the contact 36 with the contact 36b closes the plate circuit of the rectifier 32 from the lead 13 through contacts 36 and 36b to the plate 32a, thence to the cathode 32c and then by lead 38 to the field winding 5 of the exciter and then to the lead 12; and by this circuit the rectifier 32 supplies current to the field winding 5 of the exciter to supplement and increase the current supplied to the field winding 5 by the armature 4 of the exciter. Thus the current supplied to the field winding 3 of the main dynamo-electric machine by the exciter is due to excitation of the field winding 5 both by the rectifier 32 and the exciter armature. The automatic regulation is secured by causing a comparatively small change in the voltage of the supply line 2 to produce a pronounced change of current supplied by the half-wave arc-conduction rectifier 32 intermittently to the exciter field 5 with variable periods of firing time as controlled by the change of phase of the grid 32b and by this forcing of the field of the exciter in quick response to any departure from normal of the voltage of the supply line 2, the marked change of voltage of the exciter, as controlled by the regulator, is quickly effective in changing the current supplied to the field winding 3 and thereby holds the voltage of the generator and supply lines within very close limits.

During this controlling action, the inductive reactor 8 serves the function of permitting the field strength of the exciter to be responsive in a pronounced manner to the automatic control and confines the rapid changes produced by the regulator directly to the shunt field of the exciter. If this field winding were connected directly to the armature terminals of the exciter, the rate of change of the shunt field current could be no faster than the rate of change of the armature voltage of the exciter. However, due to the action of the inductive reactor, the shunt field of the exciter acts as if it were independent of the exciter armature voltage when subjected to the intermittent pulsations of the regulator and quickly responds to any corrective regulating action as by a change of the firing time periods of the arc-conduction rectifier. The regulator can then independently force the shunt field of the exciter to change its current much more rapidly. This pronounced change of the exciter field in turn causes the exciter armature voltage to respond much faster than it would otherwise. The electrical and magnetic characteristics of the inductive reactor are such that, although it has practically no effect on a constant direct current, it offers a very high impedance to rapidly changing currents; and it is due to these properties of the reactor that permit the substantially independent, rapid and pronounced change of current in the field winding of the exciter for securing a rapid and pronounced controlling effect, in contrast to the comparatively slow response that would result if the inductive reactor were not present in the shunt field circuit in a manner to permit short periods of substantially independent control by the regulator.

The reactor also serves to protect the rectifier 32 from excessive overloads which might occur if permitted to supply current directly to the armature of the exciter. When, however, this armature is provided with sufficiently high reactance, the provision of a special reactor 8 is not necessary.

The pronounced change of current supplied to the field winding of the exciter by the regulator upon slight departures from normal of the voltage of the main generator is accomplished in this particular embodiment of the invention by change of phase of the grid 32b of the rectifier 32, although other controlling means may be utilized for controlling a portion of the field current of the exciter.

In this particular embodiment of the invention, the bridge-connected contact type of rectifier 21 is supplied with current from the secondary winding 15 which, by deriving its current from the supply lines 2, is responsive to and reflects any slight change of supply line voltage. Consequently the current which is delivered to the cathode 23b of the tube 23 by the rectifier 21 also reflects any departure from normal of the supply lines and the heating of this cathode is similarly responsive to any change of voltage of the supply lines. By operating the tube 23 at plate saturation, the change of current in the anode circuit of this tube is very sensitive to changes in temperature of the cathode 23b. Consequently any slight change in voltage of the main generator is reflected and greatly amplified in change of current in the anode circuit of tube 23.

This results in corresponding variation of drop in volts in the resistance 25 and in change of potential of the grid 26b of the tube 26. The change of the negative bias voltage of the grid 26b correspondingly changes the resistance of the anode circuit of the tube 26. As above explained, change of resistance of this circuit with reference to the fixed capacity of the circuit containing the condenser 31, results in changing the phase of the point 30 of the primary winding 27 and correspondingly changes the phase of the grid 32b of the rectifier 32. This change of phase of the grid will correspondingly affect the firing time and thereby the intermittent periods of output of the rectifier and cause a pronounced change in the field winding of the exciter to raise or lower the voltage of the main generator as may be required.

For example, let it be assumed that an increase in load on the main generator takes place causing the generator voltage to decrease slightly. The voltage and temperature of the cathode 23b of the tube 23 will correspondingly decrease and cause a pronounced decrease in the drop in volts across the resistance 25. This correspondingly decreases the negative bias voltage of the grid 26b which increases the anode current of the tube 26 and decreases the resistance of this anode circuit. The decrease in resistance of this circuit changes the phase of the point 30 and the phase of the voltage of the grid 32b in a direction to increase the output of the rectifier 32 by increasing the duration of its firing time periods. This gives a pronounced rapid increase of current in the field winding of the exciter owing to its being connected in the anode circuit of the rectifier. By reason of the presence of the inductive reactor 8, the armature voltage of the exciter is rapidly increased as well as the current supplied to the field winding 3 of the main generator, thus maintaining the voltage of the main generator substantially constant. As the exciter armature voltage rises in response to its increased field strength, the armature will supply additional current to its shunt field winding and reduce the load imposed on the regulator.

If the load on the main generator be decreased, causing a tendency of the voltage of the lines to increase, or if the line voltage tends to increase from any other cause, the regulator will respond to reduce the generator voltage by pronouncedly decreasing the field exciter current supplied intermittently by the regulator and thereby reduce the field excitation of the main generator in a manner similar to that above described where a decrease of generator voltage was assumed and the regulator served to impose a corrective increase.

When the regulator acts to increase or decrease the exciter voltage, hunting is prevented by the circuit which includes the condenser 39. If it be assumed that the voltage of the main generator increases slightly and thereby causes the current from the rectifier 21 through the resistance 24 to increase, resulting in the regulator causing a rapid decrease of current supplied to the field winding of the exciter and the armature voltage of the exciter to decrease, there will be a discharge from the condenser 39 towards the positive terminal of the exciter armature and through a portion of the resistance 24 and thereby reduce the available current passing through the cathode 23d. This tends to check the action of the regulator in reducing the voltage of the exciter armature causing a momentary counteracting effect. On the other hand, when the voltage of the main generator tends to decrease and to cause a reduction of current from the rectifier 21 through the resistance 24 and cathode 23b and thereby causing the regulator to rapidly increase the current supplied to the field winding of the exciter and to increase the voltage of the exciter armature, then a momentary charging current passes to the condenser 39 and tends to increase the current supplied to the cathode 23b and thereby counteracts the effect of the regulating action. Thus the anti-hunting means serves to dampen the attempted change imposed by the regulator in both directions, that is, when the voltage of the generator is to be raised as well as when it is to be lowered. Adjustment of the contact 40 on the resistance 24 permits the anti-hunting effect to be made the proper amount for obtaining the best results.

The purpose of the shunt field rheostat 7 of the exciter is for adjusting the general ratio in which the current supplied to the exciter field winding is proportioned between the regulator and the exciter armature and for use during manual control. The purpose of the adjustable control resistance 22 of the rectifier 21 is for adjusting the voltage at which the main generator will be maintained constant and this voltage may be adjusted within limits to any desired amount during the operation of the regulator. A decrease of this resistance will cause a decrease in the constantly maintained voltage of the generator while increase of this resistance will cause an increase in the value of this voltage.

If from any cause the line voltage of the main generator should decrease below a certain predetermined amount, determined by adjustment of the under voltage relay, the winding 34 of the relay would be unable to maintain its contacts closed. The opening of the relay contacts would, of course, prevent the regulator from supplying current to the field winding of the exciter and thus automatically cause the adjustment of the voltage of the main generator to be dependent upon manual control. For example, when the voltage is too low, as in the case of a short-circuit occurring on the main lines, it is then desirable to remove the automatic regulation, as otherwise the field would be overcharged in the attempt of the regulator to raise the voltage, and result in overloading the exciter and the main generator for a long period of time. In such a case the under voltage relay 34 acts to remove the regulator and thereby protects the exciter and main generator by keeping them within a safe condition of field excitation which would not cause damage to them, even under a pronounced short-circuit in the main line or at the main terminals. Thus this undervoltage control serves to protect the exciter and main generator from over-excitation and from injurious overloading. The fuse 41 serves to protect the regulator from overloads or any short circuit condition; and the opening of this fuse would, of course deenergize the under voltage relay magnet and cause the disconnection of the regulator at the contacts 36 and 36b. The transformer having the primary 14 has a comparatively steady load under normal conditions and is normally magnetized just below the knee of the magnetization curve. Voltages slightly above normal limits will cause comparatively large increases in the exciting current supplied to the transformer winding 14. Thus the fuse 41 may be made responsive to comparatively small increases in supply line voltage due to the resulting large increase in exciting current. By using a fuse or circuit breaker of the time delay type with a proper time delay period, adequate protection is secured from a continued overvoltage of the lines 2, as well as from other abnormal circuit conditions.

The overvoltage relay 43, 44 is desirable in some cases by the additional control it affords without necessarily removing the automatic control entirely. It is made of the sensitive type, that is, small changes in the magnet coil 44 will cause the relay to "pick up" or "drop out." It has a normally closed contact in the plate circuit of the tube 26. If the line voltage rises to a value which will cause the relay to "pick up," this contact is opened. Opening this circuit is the equivalent of increasing the bias on the grid of the tube 26 and causes the power tube 32 to reduce its output to a minimum. As the relay has a very small differential between "pick up" and "drop out," the alternating current voltage of the lines 2 will only need to drop a small amount before the contacts will reclose and permit resumption of normal operation by the control circuit. If, however, the rise in voltage has been occasioned by some abnormal condition, such as the failure of tube 23, which would result in loss of control until remedied by the operator, the relay will continue to "pick up" and "drop out" at a relatively high frequency and will maintain the generator voltage at some selected value above normal voltage.

The provision of this additional control means has the advantage that loss of regulation is not complete under certain abnormal conditions and the apparatus may function in this manner until the operator determines the reason for loss of normal control. As this means does not protect in the rare case of loss of grid control by power tube 32, the fuse 41 is desirable and will have such a relation with the exciting current of transformer 14 that it will not open the circuit and place the regulator in an inoperative condition until after the high voltage has continued for a predetermined time at a predetermined value higher than the overvoltage relay 43, 44 would maintain. The overload and undervoltage protection affects the circuits of the regulator and removes the automatic control without opening the field circuit of the exciter and permits the exciter to continue to function under manual control.

Although a preferred embodiment of this invention has been described, it will be understood that various modifications may be made therein without departing from the scope thereof.

I claim:

1. The combination of an alternating current dynamo-electric machine having a field winding, a direct current exciter for supplying said field winding, said exciter having a shunt field winding in circuit with the armature of the exciter, an inductive reactor in series in the circuit of said shunt field winding, and an automatic regulator comprising a half-wave arc-conduction rectifier deriving its energy from said machine and responsive to change of the voltage of said machine for supplying an intermittent current to said shunt field winding and connected to a point in the connection between said shunt field winding and said reactor.

2. The combination of an alternating current dynamo-electric machine having a field winding, a direct current exciter for supplying said field winding, said exciter having a shunt field winding in closed circuit with the armature of the exciter, and an automatic regulator driving its energy from said machine comprising a half-wave arc-conduction rectifier responsive to change of voltage of said machine for applying an intermittent voltage to the terminals of said shunt field winding, a space discharge tube for affecting the phase of the grid of said rectifier, and a relay responsive to overvoltage of said machine for opening the circuit of said space discharge tube affecting the phase of said grid for reducing the output of said rectifier.

3. The combination of an alternating current dynamo-electric machine having a field winding, a direct current exciter for supplying said field winding, said exciter having a shunt field winding in closed circuit with the armature of the exciter, and an automatic regulator deriving its energy from said machine comprising a half-wave arc-conduction rectifier responsive to change of voltage of said machine for applying an intermittent voltage to the terminals of said shunt field winding, a space discharge tube for affecting the phase of the grid of said rectifier, and a relay responsive to overvoltage of said machine, said relay being biased to closed position and connected in the anode circuit of said phase discharge tube for opening and closing said anode circuit for affecting the phase of said grid as the voltage of said machine rises and falls.

4. The combination of an alternating current dynamo-electric machine having a field winding, a direct current exciter for supplying said field winding, said exciter having a shunt field winding in closed circuit with the armature of the exciter, and an automatic regulator deriving its energy from said machine comprising a half-wave arc-conduction rectifier responsive to change of voltage of said machine for applying an intermittent voltage to the terminals of said shunt field winding, a space discharge tube for affecting the phase of the grid of said rectifier, a second rectifier deriving its energy from said machine and delivering a voltage corresponding to the voltage of said machine, and a relay responsive to over-voltage of said second rectifier for opening the circuit of said space discharge tube affecting the phase of said grid for reducing the output of said first named rectifier.

5. The combination of a dynamo-electric machine having a field winding, a direct current variable voltage exciter for supplying said field winding, said exciter having a shunt field winding in circuit with the armature of the exciter, an inductive reactor in series in the circuit of said shunt field winding, and an automatic regulator for varying the voltage of said exciter and responsive to change of the voltage of said machine comprising a half-wave rectifier affected by change of voltage of said machine for supplying half-wave currents of variable time periods to said shunt field winding and connected to a point in the connection between said shunt field winding and said reactor.

6. The combination of a dynamo-electric machine having a field winding, a direct current variable voltage exciter for supplying said field winding, said exciter having a shunt field winding in a permanently closed circuit with the armature of the exciter, an automatic regulator for varying the voltage of said exciter and responsive to change of the output of said machine for supplying current to said shunt field winding in conjunction with said armature, and a relay for connecting said regulator to said shunt field winding upon closure of the relay circuit and for disconnecting said regulator from said shunt field winding upon the occurrence of an abnormal condition for rendering the regulator inoperative while maintaining the shunt field circuit closed.

7. The combination of a dynamo-electric machine having a field winding, a direct current variable voltage exciter for supplying said field winding, said exciter having a shunt field winding in a permanently closed circuit with the armature of the exciter, an automatic regulator for varying the voltage of said exciter and responsive to change of the output of said machine for supplying current to said shunt field winding in conjunction with said armature, and a relay for connecting said regulator to said shunt field winding upon closure of the relay circuit and for disconnecting said regulator from said shunt field winding upon the occurrence of an abnormally low voltage of said machine for rendering the regulator inoperative while maintaining the shunt field circuit closed.

8. The combination of a dynamo-electric machine having a field winding, a direct current variable voltage exciter for supplying said field winding, said exciter having a shunt field winding in a permanently closed circuit with the armature of the exciter and having a high reactance portion in said circuit, and an automatic regulator for varying the voltage of said exciter and for supplying an intermittent current to said shunt field winding and connected to a point between said shunt field winding and said high reactance portion of said circuit, said regulator comprising a tube having an anode, cathode and control element and also comprising means responsive to change of output of said machine for affecting said control element for varying the firing time of said tube and thereby varying the time periods of said intermittent current.

9. The combination of a dynamo-electric machine having a field winding, a direct current variable voltage exciter for supplying said field winding, said exciter having a shunt field winding in a permanently closed circuit with the armature of the exciter and a high reactance portion in said circuit, and an automatic regulator for supplying intermittent current to said shunt field winding at a point between said shunt field winding and the high reactance portion of said circuit, said regulator comprising a half-wave arc-conduction rectifier comprising an anode, cathode and control element deriving its energy from said machine and responsive to change of voltage of said machine for affecting said control element for varying the firing time of said rectifier and thereby varying the time periods of said intermittent current.

10. The combination of an alternating current dynamo-electric machine having a field winding, a direct current variable voltage exciter for supplying said field winding, said exciter having a shunt field winding in a permanently closed circuit with the armature of the exciter and having a high reactance portion in said circuit, and an automatic regulator for varying the voltage of said exciter and for supplying an intermittent current to said shunt field winding and connected to a point between said shunt field winding and said high reactance portion of said circuit, said regulator comprising a half-wave arc-conduction rectifier having an anode, cathode and grid and also comprising means responsive to change of output of said machine for affecting said grid for varying the time periods of said intermittent current.

FRANK G. LOGAN.